United States Patent
Snider et al.

(10) Patent No.: US 10,187,444 B2
(45) Date of Patent: Jan. 22, 2019

(54) SYSTEM AND METHOD OF AUTOMATIC GENERATION AND INSERTION OF ANALYTIC TRACKING CODES

(71) Applicant: Deluxe Corporation, Shoreview, MN (US)

(72) Inventors: Derek Snider, Cambridge (CA); Andrew McGrath, Toronto (CA); Srdjan Milutinovic, Mississauga (CA)

(73) Assignee: Deluxe Corporation, Shoreview, MN (US)

(*) Notice: Subject to any disclaimer, the term of this patent is extended or adjusted under 35 U.S.C. 154(b) by 673 days.

(21) Appl. No.: 14/040,344

(22) Filed: Sep. 27, 2013

(65) Prior Publication Data
US 2014/0189054 A1 Jul. 3, 2014

Related U.S. Application Data

(60) Provisional application No. 61/707,692, filed on Sep. 28, 2012.

(51) Int. Cl.
*H04L 29/08* (2006.01)

(52) U.S. Cl.
CPC ............ *H04L 67/02* (2013.01); *H04L 67/22* (2013.01)

(58) Field of Classification Search
CPC ......... H04L 67/02; H04L 67/22; H04L 41/50; H04L 12/24; H04L 51/046; H04L 12/2424; H04L 41/24; H04L 12/2454
See application file for complete search history.

(56) References Cited

U.S. PATENT DOCUMENTS

| | | | | |
|---|---|---|---|---|
| 6,085,229 A * | 7/2000 | Newman | ........... | G06F 17/30867 707/E17.109 |
| 7,941,525 B1 * | 5/2011 | Yavilevich | .............. | H04L 67/22 709/203 |
| 8,527,869 B2 * | 9/2013 | Hosea | ............... | G06F 17/30905 707/732 |
| 8,762,550 B2 * | 6/2014 | Butler | ............... | G06F 17/30899 709/228 |

(Continued)

FOREIGN PATENT DOCUMENTS

| | | |
|---|---|---|
| WO | WO2002021749 A2 * | 3/2014 |
| WO | WO-2014047739 A1 | 4/2014 |

OTHER PUBLICATIONS

"International Application Serial No. PCT/CA2013/050739, International Search Report dated Jan. 6, 2014", 3 pgs.

(Continued)

*Primary Examiner* — Aaron N Strange
(74) *Attorney, Agent, or Firm* — Schwegman Lundberg & Woessner, P.A.

(57) ABSTRACT

A system and method to automatically generate and insert a tracking code may include receiving at a web server, from a requesting computing device, a webpage access request associated with a domain; in response to receiving the webpage access request; accessing a configuration file for the domain; generating an analytics tracking code based on data stored in the configuration file; accessing the webpage from a storage device; modifying the webpage to include the analytics tracking code; and transmitting, from the web server, the modified webpage to the requesting computing device.

19 Claims, 4 Drawing Sheets

(56) References Cited

U.S. PATENT DOCUMENTS

| | | | |
|---|---|---|---|
| 8,996,682 B2* | 3/2015 | Stevenson | G06Q 30/02 709/224 |
| 2002/0111865 A1* | 8/2002 | Middleton, III | G06Q 30/02 705/14.41 |
| 2003/0046385 A1* | 3/2003 | Vincent | H04L 29/06 709/224 |
| 2004/0029565 A1* | 2/2004 | Shibata | H04M 3/382 455/411 |
| 2008/0046562 A1 | 2/2008 | Butler | |
| 2008/0104224 A1* | 5/2008 | Litofsky | G06F 17/3089 709/224 |
| 2008/0228863 A1 | 9/2008 | Mackey | |
| 2010/0125852 A1* | 5/2010 | Grant | G06F 8/71 719/311 |
| 2010/0130167 A1* | 5/2010 | Bennett | H04L 63/30 455/411 |
| 2010/0318976 A1 | 12/2010 | Everly et al. | |
| 2011/0035375 A1* | 2/2011 | Bekkerman | G06F 17/30867 707/734 |
| 2011/0282733 A1* | 11/2011 | Gnanasambandam | G06Q 30/02 705/14.44 |
| 2011/0314092 A1* | 12/2011 | Lunt | G06F 17/30876 709/203 |
| 2013/0304906 A1* | 11/2013 | Yavilevich | H04L 67/22 709/224 |
| 2014/0379906 A1* | 12/2014 | Agerberg | G06Q 30/0201 709/224 |

OTHER PUBLICATIONS

"International Application Serial No. PCT/CA2013/050739, Written Opinion dated Jan. 6, 2014", 5 pgs.

* cited by examiner

SYSTEM AND METHOD OF AUTOMATIC GENERATION AND INSERTION OF ANALYTIC TRACKING CODES

RELATED-APPLICATIONS

This patent application claims the benefit of priority, under 35 U.S.C. § 119(e), to U.S. Provisional Patent Application Ser. No. 61/707,692, titled "SYSTEM AND METHOD OF AUTOMATIC GENERATION AND INSERTION OF ANALYTIC TRACKING CODES," filed on Sep. 28, 2012, which is incorporated by reference in its entirety.

TECHNICAL FIELD

This patent document pertains generally to web analytics, and more particularly, but not by way of limitation, to a system and method of automatic generation and insertion of analytic tracking codes.

BACKGROUND

When a small business owner (or other user) decides to create a website the owner often would like to track the behavior or information about users of the website. The process of collecting and reporting the data is traditionally known as analytics. The analytics might include storing the path a user takes through a website to help the owner improve the design on the website. The analytics might also track what a user is "looking" at or how long a user stays on a webpage of the website. Analytics may also include tracking where the requesting user's device is located (e.g., geographic analytics) or how the user arrived at the webpage (e.g., via a search results page).

BRIEF DESCRIPTION OF DRAWINGS

Some embodiments are illustrated by way of example and not limitation in the figures of the accompanying drawings in which.

DETAILED DESCRIPTION

Figure 1:
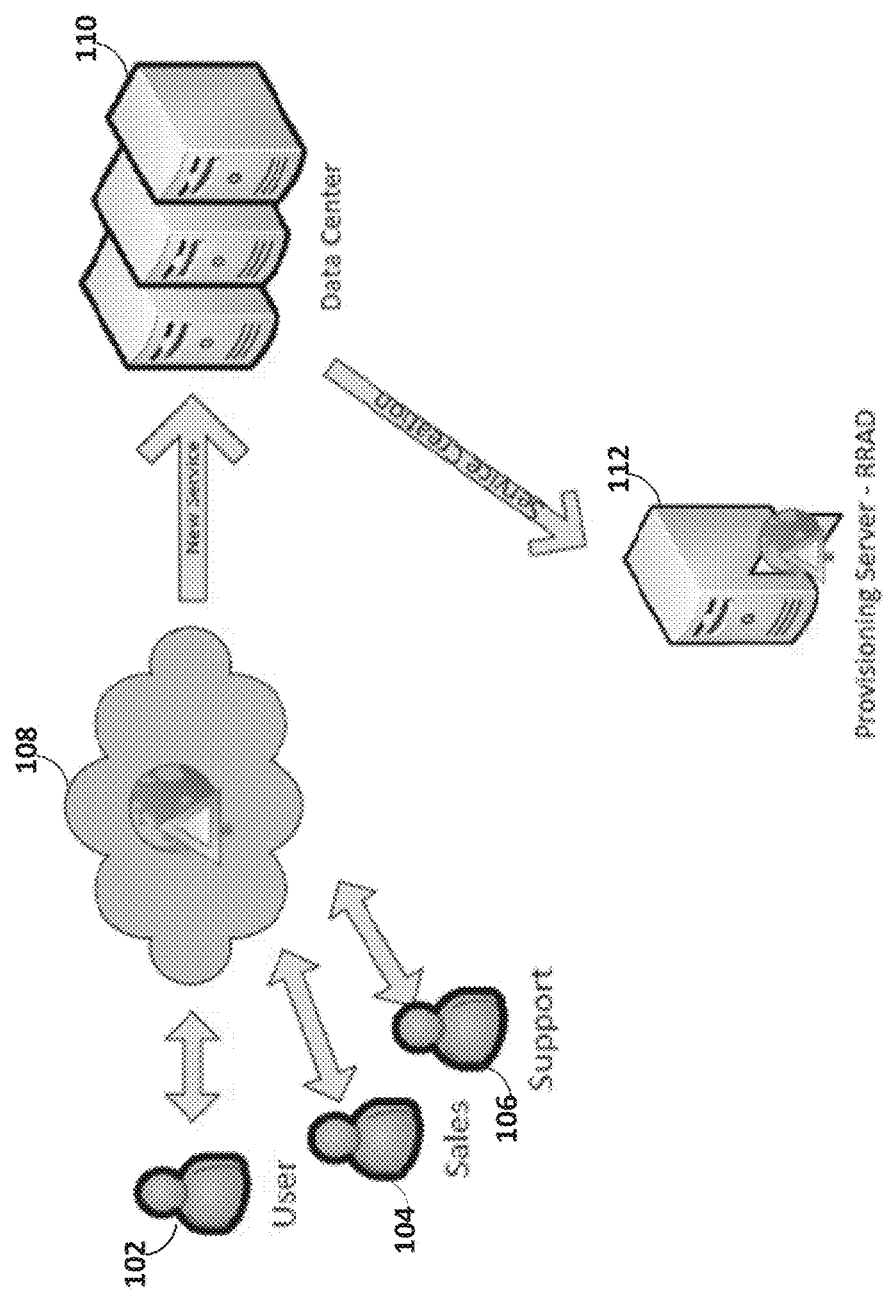
FIG. 1 illustrates a diagrammatic representation of a customer establishing a line of service, according to an example embodiment.

In the following description, for purposes of explanation, numerous specific details are set forth in order to provide a thorough understanding of some example embodiments. It will be evident, however, to one skilled in the art that the present invention may be practiced without these specific details.

In order to collect the data for analytics of a website the owner or manager (referred to as a customer herein) of the website may include a tracking code on each webpage of the website. When this code is rendered by a browser of a user, the tracking code will be executed and collect the necessary analytics. In some examples, the tracking code will send data to a tracking system server that is separate from the web server that hosts the website. A tracking code may include an identification of an account of the customer that is sent to the tracking system to associate any analytics data with the customer.

In an example setup of a website, an owner of the website may go through the process described herein. While the following example lists several entities such as domain registrar, website hosting server, and tracking system server, one or more companies may manage all of the entities. Additionally, other people associated with owner (e.g., employees) may complete the below steps.

In an example, a customer purchases a domain, such as "example.com," from a domain registrar. The customer may then contract with a hosting company to host the customer's website. The customer may then create, manually or through a wizard process, one or more webpages and upload them to the web hosting company. In other words, when a user connects to "example.com" via a browser, the hosting company will serve the webpages of website to the user's computer.

If the customer wishes to have analytics tracking on his or her website, the customer may also establish an account with a tracking system. In an example, the tracking system generates a tracking code and instructs the owner to place the tracking code on each of the webpages the owner wants to collet analytics data on. The tracking code may include a customer identification of the customer so the tracking system can associate any received analytics data with the customer. The tracking code may also include a link to a script that, when run, collects the analytics data.

Many people that create a website use automated tools and website builders to generate their website as they often do not know how to code a website. As such, many people are unable to edit their website to include the tracking code because of the automated nature of the website's creation or lack of technical knowledge. Thus, many website owners are not able to easily obtain analytics associated with the use of their website.

Described herein is an example solution to the problem of enabling web analytics at the time of domain and hosting registration with limited user interaction. For example, upon a customer establishing a line of service (e.g., hosting a website) with a web hosting company, the hosting company may transmit a request to a tracking system server to establish a tracking account with the tracking system. The tracking system may respond to the hosting company with a customer identification and tracking code format to insert into the customer's webpages. The hosting company may generate a configuration file that includes at least the customer identification and store the configuration file in the public folder of the domain on a web server. Then, when a request for a webpage on the domain of the customer is received at the web server, the web server may generate an analytics tracking code using the format of the tracking system and customer identification and insert the tracking code into the webpage before transmitting it back to the requesting device.

In addition to making setting up analytics tracking simple for a customer, there is an added benefit that switching tracking system becomes a simple task. For example, the hosting company may decide that a different tracking system provides additional or better implemented features. Thus, the hosting company may establish accounts for a customer with the new tracking system and update the configuration file of the customer to include a new customer identification. In various examples, more than one tracking system may be used for each customer.

FIG. 1 illustrates a diagrammatic representation of a customer establishing a line of service, according to an example embodiment. FIG. 1 illustrates customer 102, sales user 104, support user 106, network 108, hosting data center 110, and provisioning server 112. The components illustrate in FIG. 1 may interact via one or more networks such as network 108. Hosting data center 110 and provisioning server 112 may each include at least one computer with at least one processor. The at least one processor may execute instructions stored on a storage device of the at least computer which configure the at least one processor to perform the operations described herein.

Network 108 may include local-area networks (LAN), wide-area networks (WAN), wireless networks (e.g., 802.11 or cellular network), the Public Switched Telephone Network (PSTN) network, ad hoc networks, personal area networks (e.g., Bluetooth) or other combinations or permutations of network protocols and network types. Network 108 may include a single local area network (LAN) or wide-area network (WAN), or combinations of LAN's or WAN's, such as the Internet. The various devices coupled to network 108 may be coupled to network 108 via one or more wired or wireless connections.

In an example, customer 102 may be a person that is establishing a line of service (e.g., web site hosting) with a hosting company represented in part by hosting data center 110. Sales user 104 and support user 106 may be employees of the hosting company that interact (e.g., telephonically, electronic messaging, etc.) with customer 102 to establish the line of service. For example, hosting data center 110 may include a setup application that sales user 104 access to establish the line of service for customer 102. Hosting data center 110 may also serve an interface (e.g., webpage) to user 102 that is configured to receive input from user 102 to establish the line of service.

In an example, customer 102 accesses hosting data center 110 via a user terminal A user terminal may be a personal computer or mobile device. In an embodiment, user terminal includes a client program to interface with hosting data center 110. The client program may include commercial software, custom software, open source software, freeware, shareware, or other types of software packages. In an embodiment, the client program includes a thin client designed to provide query and data manipulation tools for a user of the user terminal. The client program may interact with a server program hosted by, for example, hosting data center 110, to establish a line of service.

In an example, establishing a line of service with hosting data center 110 includes obtaining information from customer 102. For example, billing information and an account identification may be established for the customer. Furthermore, customer preferences with respect to analytics for the customer's website may be determined. For example, basic analytics may include geographic (e.g., based on the IP address of a request) and temporal (e.g., what time of day requests most frequently occur) analytics regarding visitors to the customer's website. More complex analytics may include heat map data that infers where a visitor is looking on the website based on cursor data or other measurable data of the visitor. Customer 102 may indicate what type of analytics the customer wants for his or her website during the service provisioning. As indicated above, the preferences of the user may be received via a webpage or interaction with employees of the hosting company.

In an example, hosting data center 110 transmits the data obtained from customer 102 to provisioning server 112. While illustrated as multiple servers in FIG. 1, hosting data center 110 and provisioning server 112 may be the same physical server or include multiple servers. The data obtained may formatted in a standardized format (e.g., according to an XML schema) such that provisioning server 112 may parse the data.

Figure 2:
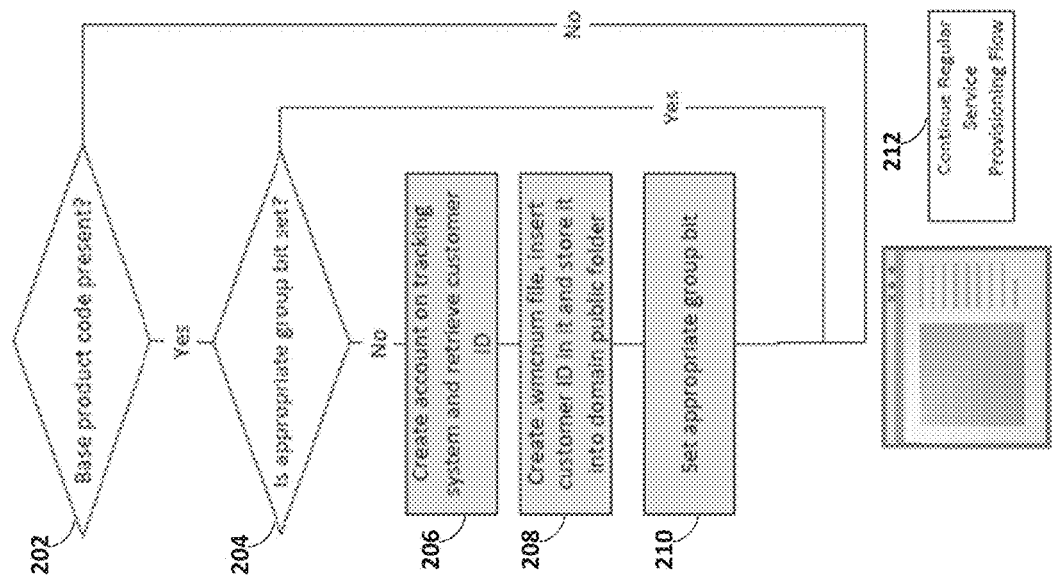
FIG. 2 illustrates a flowchart of the process of provisioning a line of service for a customer, according to an example embodiment.

FIG. 2 illustrates a flowchart of the process of provisioning a line of service for a customer, according to an example embodiment. For example, provisioning server 112 may use information received from hosting data center 110 that was obtained during a new line of service setup from a customer.

In an example, at decision block 202 it is determined if a base product code is present, at decision block 204 it is determined if the appropriate group bit has been set, at block 206 an account is created on a tracking system, at block 408 a customer identification is retrieved, at block 210 a configuration file is created and stored in the public folder of the domain, at block 212 the appropriate group bit is set, and at block 414 the regular service provisioning flow is continued.

In an example, at decision block 202 provisioning server 112 checks if the base product code is present. If base product code is a part of the overall product code/SKU and is present in the product database in that product definition, it may signal the provisioning server to create the associated service and perform the necessary actions to create and configure its elements, accounts and applications. If the base product is present, flow continues to decision block 204. If the base product code is not present, flow continues to the regular service provisioning flow at block 214.

In an example, at decision block 204, provisioning server 112 checks if the appropriate group bit has been set. Setting the bit in the group permissions of the directory (group bit) containing the domain files may signal the web server that this domain is authorized for modification and tracking code should be automatically inserted while serving its pages. If the appropriate group bit has been set, flow continues to block 214 and regular service provisioning is resumed. If the appropriate group bit has not been set, flow continues to block 206.

In an embodiment, at block 206 an account is created at a tracking system for the customer. In various embodiments, the tracking system is run on the same server as the provisioning server or hosting data center servers. To create an account, provisioning server 112 may invoke one or more Application Programming Interface (API) calls of the tracking system via network 108. The calls may take inputs of a customer name and domain. In an embodiment, the inputs are encrypted in the API call. In an embodiment, provisioning server 112 may execute a program stored at provisioning server 112 to create the account when the tracking system is part of the provisioning server.

Using the inputs, the tracking system may generate an account on the tracking system for the customer. In various embodiments, generating an account may include generating an entry in an account database stored at the tracking system. The entry may include the customer's name and a generated customer identification as well as the domain name that the customer has registered and is hosting with the hosting company.

In response to the account generation, the tracking system may return (e.g., transmit or route) the customer identification stored in the account database associated with the customer. The customer identification may include one or more numbers, letters, or symbols (e.g., A123455). In addition to the customer identification, other information may be transmitted back to the provisioning server. For example, a tracking campaign may be set up for the customer. A campaign may define the period for analytics tracking. For example, a campaign may run for three months. Therefore, a campaign identification may be generated and transmitted back to the provisioning server. The campaign identification may also be stored in an entry in the account database associated with the customer.

In various examples, the customer may already have a generated account at the tracking system. Thus, an account may not need to be generated at the tracking system. However, the entry associated with the customer may be updated to include the domain (e.g., if the customer has multiple domains) included in the API call. In an embodiment, a new entry is created that includes the customer's name, already generated customer identification, and a domain. Thus, there may be multiple entries in the account database for a single customer. The data fields (e.g., name, domain) of the entries are for illustration purposes and more or fewer data fields with different names may be used.

In an example, at block 208, a configuration file (illustrated as .wmcnum) is generated at the provisioning server for the customer and stored in the domain's public folder. The configuration file may be formatted according to a standardized format (e.g., XML) and include the customer identification and optionally the campaign identification as received from the tracking system.

In an embodiment, the configuration file is stored in the public folder of the customer's domain. For example, provisioning server 112 may determine which web server(s) of a plurality of web servers the customer's domain is to be hosted. Within the determined server(s) there may be a file structure associated with the customer. For example, there may be "cgi-bin" folder for the domain that stores interactive programs such as Perl or JAVA® programs, a "conf" folder that stores configuration files, and an "htdocs" that stores the files served to a requesting computer device. In an embodiment, the "htdocs" folder is the customer's public folder. For example, consider an "index.html" filed stored in the "htdocs" folder. If a user's browser executing on a computing device requests "http://www.example.com/index.html," the "index.html" may be transmitted from the hosting web server back to the requesting user's computing device. The names of the folders are for illustration purposes and may be changed.

In an example, at block 210, the appropriate group bit for the domain is set and at block 212 the regular service provisioning is continued. This may signal web server to insert the tracking code while serving the pages in the runtime.

Figure 3:
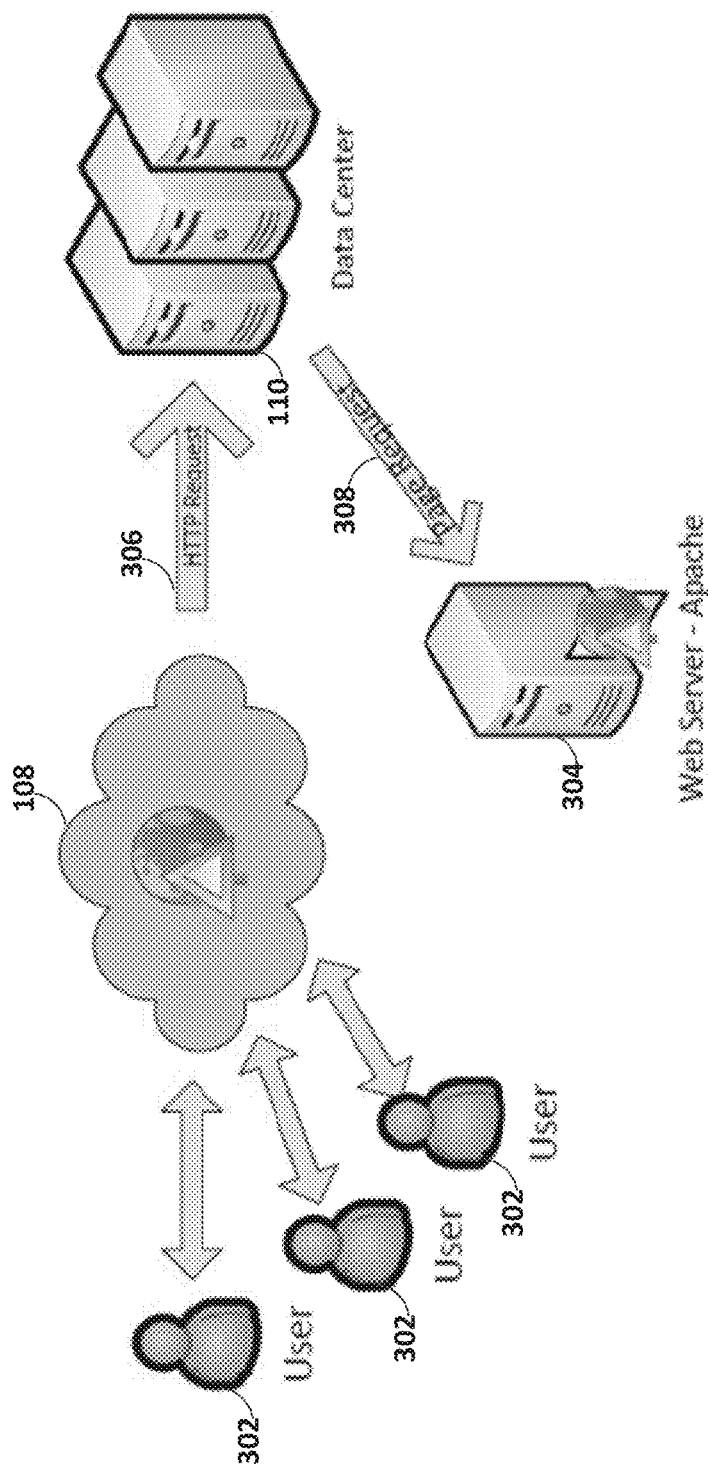
FIG. 3 illustrates a diagrammatic representation of a user using a terminal device to request a webpage from a web server, according to an example embodiment

FIG. 3 illustrates a diagrammatic representation of a user using a terminal device to request a webpage from a web server, according to an example embodiment. FIG. 3 includes users 302, network 108, hosting data center 110, and web server 304, HTTP request 306, and page request 308.

In an embodiment, a user 302 uses a user terminal (e.g., personal computer) to request a webpage. For example, the user may use a browser and enter in a webpage address using an input device (e.g., mouse) of the user terminal. The webpage address may be for the domain of the customer. The request may be formatted as HTTP request 306 and transmitted via network 108 to hosting data center 110. Hosting data center 110 may process the HTTP request to determine that web server 304 handles the HTTP requests for the requested webpage domain (i.e., the domain of the customer). Then, page request 308 may be made to retrieve the page associated with HTTP request 304 (e.g., index.html).

In an example, web server 304 is responsible for responding to HTTP requests. For example, web server 304 may be run as an Apache web server. The web server may access one or more files stored on the web server or other locations and communicate the files back to a requesting device. In various embodiments, web server 304 may modify the files before communicating the files using an Apache module. The files may be rendered as user-interfaces on a browser of a requesting computing device. The files may be implemented using a variety of programming languages or programming methods, such as HTML (HyperText Markup Language), VBScript (Visual Basic® Scripting Edition), JavaScript™, XML® (Extensible Markup Language), XSLT™ (Extensible Stylesheet Language Transformations), AJAX (Asynchronous JavaScript and XML), Java™, JFC (Java™ Foundation Classes), and Swing (an Application Programming Interface for Java™). Web server 304 may include at least one computer with at least one processor. The at least one processor may execute instructions stored on a storage device of the at least computer which configure the at least one processor to perform the operations described herein.

Figure 4:
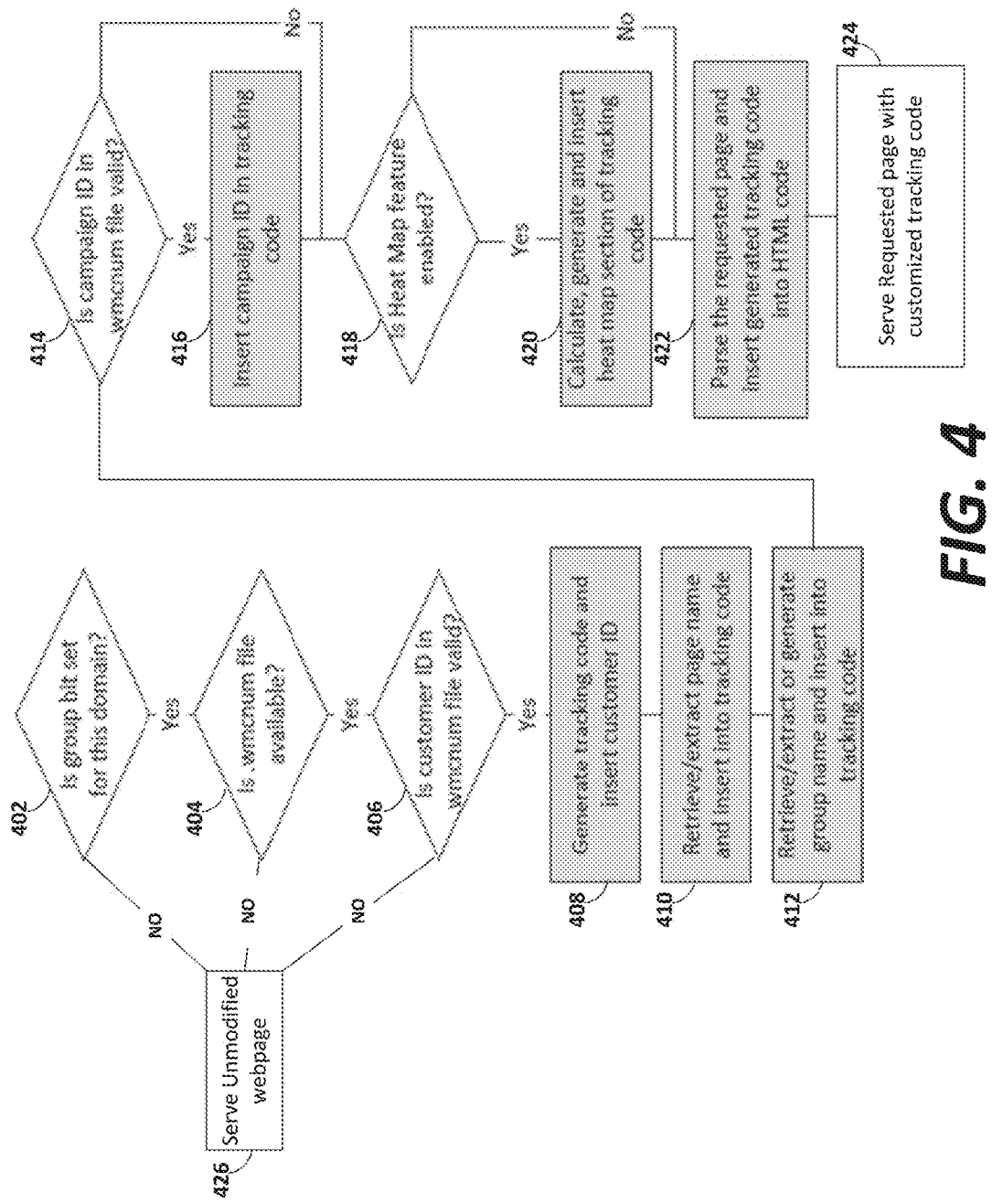
FIG. 4 illustrates a flowchart of the process of responding to a page request, according to an example embodiment.

FIG. 4 illustrates a flowchart of the process of responding to a page request, according to an example embodiment. For example, web server 304 may respond to HTTP request 306.

In an example, at decision block 402 it is determined if the group bit for the domain is set, at decision block 404 it is determined if the configuration file is available, at decision block 406 it is determined if the customer identification in the configuration file is valid, at block 408 a tracking code is generated with the customer identification inserted therein, at block 410 the page name is retrieved or extracted and inserted into the tracking code, at block 412 the group name is retrieved or extracted and inserted into the tracking code, at decision block 414 it is determined if a campaign identification is valid in the configuration file, at block 416 the campaign identification is inserted into the tracking code, at decision block 418 it is determined if a heat map feature is enabled, at block 420 a heat map section is inserted into the tracking code, at block 422 the requested page is parsed and the tracking code is inserted, at block 424 the requested page is transmitted with the customized tracking code, and at block 426 an unmodified version the requested page is transmitted.

In an example, at decision block 402 it is determined if the group bit is set for the requested domain (e.g., example.com) by checking the domain directory permissions. If the group bit has been set, flow may continue to decision block 404. If the group bit has not been set for the domain, flow may continue at block 426.

In an example, at decision block 404 is determined if a configuration file is available for the domain. For example, web server 304 may check the public folder of the domain for the configuration file. The configuration file may have the same name across domains even though the contents may differ. For example, the configuration file may be named ".trackingconf." Thus, web server 304 may perform a check for the ".trackingconf" in the public folder for the domain. If the configuration file is available, flow may continue to decision block 406. If the configuration file is not found, flow may continue at block 426.

In an example, at decision block 406, it is determined if a customer identification in the configuration file is valid. For example, web server 304 may issue an API call to the tracking system to determine if the customer identification in the configuration file exists, and if the identification is associated with the requested domain. If the customer identification is valid, flow may continue at block 408. If the customer identification is not valid or does not exist, flow may continue at block 426.

In an example, at block 408 an analytics tracking code (tracking code) is generated and the customer identification is inserted into the tracking code. In various embodiments the tracking code is a JavaScript code with one or more customizable fields related to analytics tracking. A template of the tracking code may be stored and used as the basis for the generation. The template may be received form the tracking system. The fields may be customized based on the information in the configuration file. Similarly, new fields may added and existing fields may be removed as necessary for customizing the tracking code. For example, the code template may be the following:

```
<!-Tracking Code START -->
<script type='text/javascript'
src='https://acmetrackingsystem.com/track.js'></script>
<script type='text/javascript'><!--
cust_id='13aa26eac3508d3f'; // identification from config. file
page_name='index.html'; //page name
group_name='group name';
campaign_id='campaign_id'; // campaign if any from the config. file
// -->
</script>
<!-Tracking Code END -->
```

At block 410, in an example, a page name is retrieved or extracted and inserted into the tracking code. For example, the page name may be determined by examining the HTTP request. The "page_name" field may be updated to reflect the page name of the request.

At block 412, in an example, the group name is retrieved from the URL or extracted from configuration file and inserted into the tracking code.

At decision block 414, it is determined if a campaign identification in the configuration file is valid. For example, web server 304 may issue an API call to the tracking system to determine if the campaign identification in the configuration file exists, and if the identification is associated with the requested domain. If the campaign identification is valid, flow may continue at block 416 where the campaign identification is inserted into the tracking code. If the customer identification is not valid or does not exist, flow may continue at decision block 418.

At decision block 418, in an example, it is determined if the heat map feature has been enabled. For example, an API call may be made to the tracking system using the customer identification to determine which analytic features have been enabled. In an example, the determination is made by issuing a call to the hosting data center. In yet another example, the configuration file may include which features are enabled. Similarly, other analytic features beyond a heat map may also be checked for. If the heat map feature has been enabled, flow may continue to block 420 where the necessary code may be generated and inserted into the tracking code to enable heat map tracking. If the feature has not been enabled, flow may continue to block 422.

In an example, at block 422, the requested page is parsed and the generated tracking code is inserted into the HTML of the requested page. For example, the requested page (e.g., index.html) may be retrieved from a storage device of web server 304. The requested page may be opened and parsed to determine a place for the generated tracking code. In various examples, the structure of a webpage includes various sections identified by tags. For example, an HTML may include a "head" section identified by <head> and closed by </head> and a "body" section identified by <body> and closed by </body>. Depending on the tracking system, the tracking code may be placed in different places of the webpage. For example, the tracking system may instruct the web server to place the tracking code after all other content but before the </body> closing tag. At block 422 the tracking code may be placed according to the preference of the tracking system. The preference may be indicated in the configuration file or be set in an Apache module.

At block 424, in an example, the modified webpage with the inserted tracking code customized according to the process above is transmitted back to the requesting device. If the answer to decision blocks 402, 404, or 406 was "no," the unmodified webpage may be transmitted back to the requesting device at block 426.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method comprising:
   receiving at a web server, from a requesting computing device, a webpage access request for a webpage associated with a domain;
   in response to receiving the webpage access request:
   accessing a configuration file for the domain;
   extracting a tracking format from the configuration file, the tracking format corresponding to a tracking system accessible by the web server;
   retrieving a campaign identification from the configuration file associated with an analytics campaign;
   determining that a group bit is set;
   in response to the group bit being set, generating an analytics tracking code based on data stored in the configuration file, the analytics tracking code generated using the tracking format and inserting the campaign identification into the analytics tracking code;
   accessing the webpage from a storage device;
   modifying the webpage to include the analytics tracking code; and
   transmitting, from the web server, the modified webpage to the requesting computing device.

2. The method of claim 1, wherein generating the analytics tracking code comprises:
   retrieving a customer identification from the configuration file;
   validating the customer identification; and inserting the customer identification into the analytics tracking code.

3. The method of claim 1, wherein generating the analytics tracking code comprises:
   based on determining that heat map analytics are enabled for the domain:
   generating heat map analytics code; and
   inserting the heat map analytics code into the analytics tracking code.

4. The method of claim 1, wherein modifying the webpage to include the analytics tracking code comprises:
   parsing the webpage to identify a placement for the analytics tracking code.

5. The method of claim 1, comprising:
   determining that the domain has been authorized for modification before modifying the webpage.

6. The method of claim 1, wherein the analytics tracking code is not generated before the webpage access request.

7. The method of claim 1, wherein generating the analytics tracking code includes validating the campaign identification before inserting the campaign identification into the analytics tracking code.

8. A method comprising:
   provisioning a web site associated with a domain on a web server;
   transmitting a request to establish an account at a tracking server for the domain;
   retrieving a customer identification from the tracking server for the domain;
   storing a configuration file for the domain on the web server, the configuration file including the customer identification and a tracking format, the tracking format corresponding to a tracking system from the tracking server;
   retrieving a campaign identification from the configuration file associated with an analytics campaign;
   determining that a group bit is set;
   in response to the group bit being set, generating an analytics tracking code based on data stored in the configuration file when a webpage is requested, from a computing device, associated with the domain, the analytics tracking code generated using the tracking format and inserting the campaign identification into the analytics tracking code; and
   inserting the analytics tracking code into the webpage before transmitting the webpage to the computing device.

9. The method of claim 8, further comprising:
   storing a campaign ID in the configuration file.

10. The method of claim 8, comprising:
    authorizing tracking analytics for the domain.

11. The method of claim 8, wherein generating an analytics tracking code includes generating an analytics tracking code with the customer identification inserted into the analytics tracking code.

12. The method of claim 8, comprising:
    storing a preference for a type of analytics in the configuration file.

13. The method of claim 12, wherein generating the analytics tracking code includes configuring the analytics tracking code to include heat map analytics when the preference for the type of analytics includes heat map analytics.

14. The method of claim 12, wherein storing the configuration file for the domain on the web server includes storing the configuration file in a public folder of the domain on the web server.

15. A non-transitory machine readable medium comprising instructions, which when executed by at least one processor, cause the processor to perform operations comprising:
    receive at a web server, from a requesting computing device, a webpage access request for a webpage associated with a domain;
    in response to the webpage access request:
    access a configuration file for the domain;
    extract a tracking format from the configuration file, the tracking format corresponding to a tracking system accessible by the web server;
    retrieve a campaign identification from the configuration file associated with an analytics campaign;
    determine that a group bit is set;
    in response to the group bit being set, generate, using the tracking format, an analytics tracking code based on data stored in the configuration file and insert the campaign identification into the analytics tracking code;
    access the webpage from a storage device;
    modify the webpage to include the analytics tracking code; and
    transmit the modified webpage to the requesting computing device.

16. The non-transitory machine readable medium of claim 15, wherein the instruction to generate the analytics tracking code comprise instructions to:
    retrieve a customer identification from the configuration file;
    validate the customer identification; and
    insert the customer identification into the analytics tracking code.

17. The non-transitory machine readable medium of claim 15, wherein the instructions to generate the analytics tracking code comprise instructions to:
    determine the heat map analytics are enabled for the domain;
    generate a heat map analytics code; and
    insert the heat map analytics code into the analytics tracking code.

18. The non-transitory machine readable medium of claim 15, wherein the instructions are configured to determine the domain has been authorized for modification before the instructions modify the webpage.

19. The non-transitory machine readable medium of claim 15, wherein the instructions receive the webpage access request before the instructions generate the analytics tracking code.

* * * * *